United States Patent [19]

Lindstrom

[11] Patent Number: 5,485,391
[45] Date of Patent: Jan. 16, 1996

[54] APPARATUS AND METHOD FOR ENSURING PROPER MACHINING OF A WORKSHEET

[75] Inventor: Mikko Lindstrom, Streamwood, Ill.

[73] Assignee: Finn-Power International, Inc., Schaumburg, Ill.

[21] Appl. No.: 216,364

[22] Filed: Mar. 23, 1994

Related U.S. Application Data

[63] Continuation of Ser. No. 773,317, Oct. 10, 1991, abandoned.

[51] Int. Cl.$^6$ .................................................. G05B 19/18
[52] U.S. Cl. ................................. 364/474.17; 364/474.21
[58] Field of Search ......................... 364/474.16–474.21; 318/561; 483/1, 29; 72/446, 448, 442; 83/698.91, 620

[56] References Cited

U.S. PATENT DOCUMENTS

| | | | |
|---|---|---|---|
| 4,182,022 | 1/1980 | Kristiansson | 483/29 |
| 4,214,191 | 7/1980 | Watanabe et al. | 318/561 |
| 4,296,364 | 10/1981 | Fukuyama et al. | 364/474.17 |
| 4,351,029 | 9/1982 | Maxey et al. | |
| 4,389,709 | 6/1983 | Knibiehler et al. | |
| 4,456,960 | 6/1984 | Wakai | 364/474.17 |
| 4,497,026 | 1/1985 | Kiyokawa | 364/474.17 |
| 4,608,644 | 8/1986 | Kiya | 364/474.17 |
| 4,616,322 | 10/1986 | Niwa et al. | |
| 4,620,281 | 10/1986 | Thompson et al. | 364/474.17 |
| 4,658,245 | 4/1987 | Dye et al. | 364/474.17 |
| 4,702,650 | 10/1987 | Golwas et al. | |
| 4,719,691 | 1/1988 | Klingel | 483/29 |
| 4,748,554 | 5/1988 | Gebauer et al. | 364/474.19 |
| 4,779,329 | 10/1988 | Nordquist et al. | 483/29 |
| 5,134,767 | 8/1992 | Yasuda | |
| 5,205,805 | 4/1993 | Otani et al. | 364/474.21 |
| 5,269,739 | 12/1993 | Maynard et al. | 483/29 |

FOREIGN PATENT DOCUMENTS

| | | |
|---|---|---|
| 0120974 | 10/1984 | European Pat. Off. . |
| 2548070 | 1/1985 | European Pat. Off. . |
| 0134935 | 2/1985 | European Pat. Off. . |
| 2195504 | 3/1974 | France . |
| 61-099529 | 5/1986 | Japan . |

*Primary Examiner*—James P. Trammell
*Attorney, Agent, or Firm*—Pollock, Vande Sande & Priddy

[57] ABSTRACT

To ensure that a worksheet is effectively operated on, the present invention system monitors the life expectancy of a tool by counting the number of hits the tool has made so that when it is reached, the tool is replaced by a spare tool. Alternatively or in combination therewith, in place of monitoring the life expectancy of the tool, the operational effectiveness of the tool is monitored. Thus, anytime that the operational effectiveness of the tool is deemed to fall below a given standard, the tool is replaced by a spare tool. The replacing of the tool by a spare, and the subsequent replacement of the spare tool by yet another spare can go on ad infinitum. With such a system, severe failure of tools are prevented.

48 Claims, 6 Drawing Sheets

APPARATUS AND METHOD FOR ENSURING PROPER MACHINING OF A WORKSHEET

This application is a continuation of Ser. No. 773,317 filed on Oct. 10, 1991 now abandoned.

FIELD OF THE INVENTION

The present invention is directed to sheet machining centers and more particularly to an apparatus and a method of ensuring that a worksheet by an operationally effective tool is not worked on by an operationally ineffective machine tool.

BRIEF DESCRIPTION OF THE PRIOR ART

When machining a worksheet or workpiece, if an operator does not have any idea on when a tool such as a punch in a machine tool such as a turret punch press has reached its useful life, i.e. when a tool has been damaged or is about to approach the end of its useful life, should the tool actually fails, manufacturing costs naturally would rise since worksheets worked on by such failed tools are useless. This is especially true in automatic numerically controlled unmanned systems where such severe failure would go unnoticed for a long time.

There are prior art systems which attempt to solve this problem by replacing the failed tool with a spare tool. One such system is disclosed in U.S. Pat. No. 4,389,709 wherein a signal generator is used to initiate a count period during which the tool is operating. The periods in which the tool operates are then accumulated until such accumulated periods exceed a given time. At which time the tool is replaced by a spare tool. Thus, the '709 patent describes a system for replacing a tool with a spare by determining the amount of time which a tool has been in use. Another system in which a tool is replaced by a spare tool is disclosed in U.S. Pat. No. 4,616,322. There a complex system is disclosed whereby tool transfer and tool replacing robots are used to move spare tools from a spare tool stocker to tool magazines. The operational period of the tool is then divided into a plurality of operational period sections, with at least one primary tool being used within each of the operational period sections. A prospective used time within each of the operational period sections is then calculated in terms of the primary tool. The life expectancy (i.e. useful life) of the tool is determined within each of the operational period sections and is based upon the prospective used time as well as an accumulative past used time and a life time registered in a data memory. Although disclosed as measuring the time that the tool is being used, the '322 patent fails to teach how such periods of use are measured and/or calculated. Moreover, needless to say, the '322 system is quite cumbersome.

BRIEF DESCRIPTION OF THE PRESENT INVENTION

To ensure that a worksheet (workpiece) is effectively machined, the present invention relates essentially to a spare tool system which includes a broken machine tool subsystem to sense a tool failure. If a tool failure is sensed, the failed tool is replaced by a spare.

Alternatively or in conjunction therewith, a register means may be used to count the number of times which a tool has operated, as for example when a punch has made a hole or an opening (a hit) on a worksheet. The counted number of operation (i.e. the number of hits) of the tool is then compared with an operational safety limit number established, for example, by the manufacturer of the tool. Thus, if the counted number of hits for the tool reaches the established safety limit, the tool is automatically replaced. The count register means can of course be set to have a number greater or less than the established safety limit number, depending on the operator's experience with that given type of tool. In other words, the operator may want to add an extra safety margin by lowering the number of counted hit times before a tool is replaced by a spare, if he feels that the established safety limit by the manufacturer is overly optimistic.

It is therefore an objective of the present invention to provide a simple and yet elegant system of ensuring that a workpiece is effectively worked on, by ensuring that the tool that works on the worksheet is operationally effective.

It is another objective of the present invention to provide a system in which any estimation of the effectiveness of a work tool is eliminated.

It is yet another objective of the present invention to provide a system that redundantly ensures a worksheet is operated on by functioning tools.

DESCRIPTION OF THE FIGURES

The above-mentioned objectives and advantages of the present invention will become more apparent and the invention itself will be best understood by reference to the following description of the invention taken in conjunction with the accompanying drawings wherein.

DETAILED DESCRIPTION OF THE PRESENT INVENTION

Figure 1:
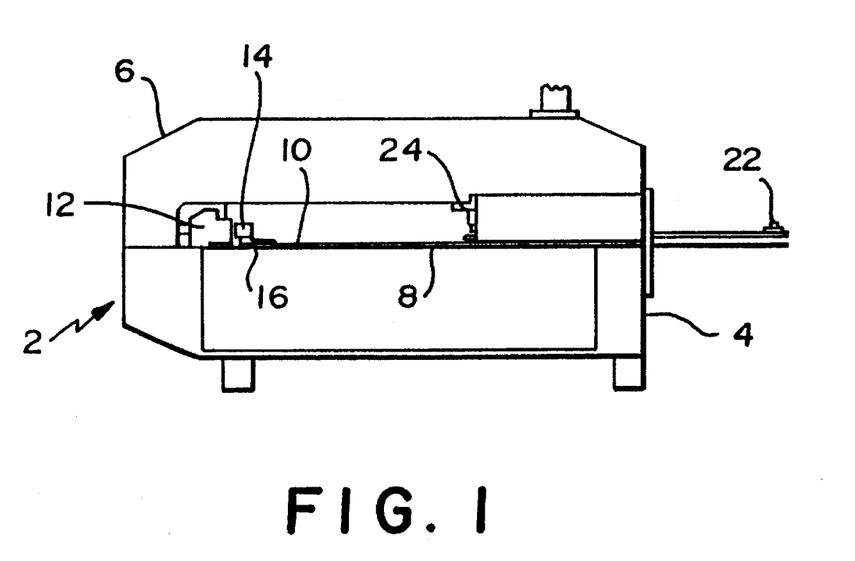
FIG. 1 is a side view of a representative sheet metal machining (machine tool) station to which the present invention system is applicable.
Figure 2:
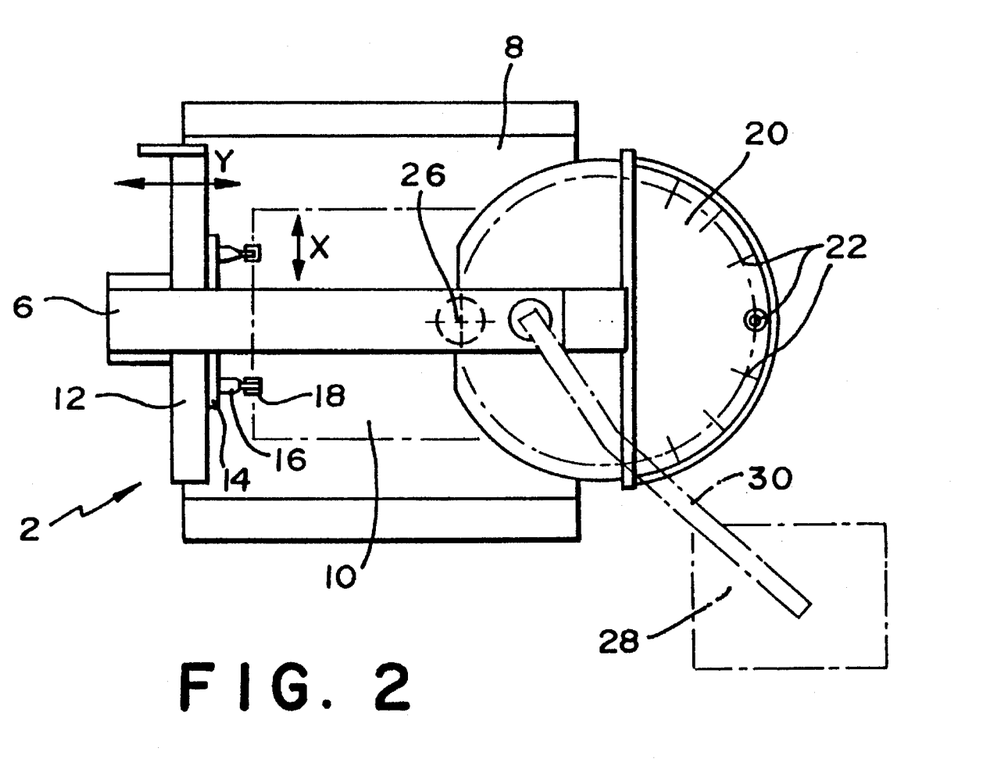
FIG. 2 is a plan view of the FIG. 1 machining station.

With reference to FIGS. 1 and 2, an automatic sheet metal machining center (commonly referred to in the industry as a machine tool) to which the system of the present invention can be applied is shown in side view (FIG. 1) and plan view (FIG. 2). Albeit the sheet metal machining center of FIGS. 1 and 2 is illustrated as a conventional turret punch press with an automatic tool changer, it should be appreciated that the system of the present invention is equally applicable to machining centers other than turret punch presses as long as tools are automatically used to effect work on a worksheet. Furthermore, it should be noted that instead of metal worksheets, the system of the present invention is equally applicable to other types of worksheets or workpieces such as plastic or cardboard, or other types of materials presented as sheets or coils. All of these materials are henceforth described as worksheets.

As shown, automatic sheet metal machining center 2 has a base frame 4 to which a top frame 6 is mounted. A worktable is indicated at 8 upon which a worksheet 10 is placed. For the illustrated automatic sheet machining center, movably mounted to frame 4 is a first carriage 12 which is moveable along the directions indicated by the Y arrows. Movably mounted to carriage 12 is a second carriage 14 which is movable along first carriage 12 in directions as indicated by X arrows. Two grippers 16 are shown to be connected to second carriage 14. As taught in U.S. Pat. No. 4,658,682, the disclosure of which being incorporated herein by reference, each gripper 16 has a pair of jaws 18 for grasping worksheet 10.

Also rotatably mounted to top frame 6 is a turret 20 in which a number of tools may be movably fitted, as for example indicated at locations 22. As is well known, turret 20 is rotatable about a center axis (CT in FIG. 3) such that each of the tools movably fitted to a corresponding receptacle at the peripheral portion thereof can be positioned under a puncher (or ram) 24 at location 26 for effecting a hole or an opening on worksheet 10. As can be gleaned from FIG. 2, inasmuch as first carriage 12 is movable along the Y axis and second carriage 14 along the X axis, worksheet 10 can be moved anywhere on worktable 8 via a combination of movements by carriages 12 and 14. Thus, a selected portion of worksheet 10 can be moved to location 26 under tool puncher 24, and the appropriate tool, so that puncher 24 can strike the tool to effect an opening on that selected portion of worksheet 10.

The sheet metal machining center 2 shown in FIG. 2 is representative of well known machining centers such as those sold by the Finn-Power Company and having, for example, manufacturing model numbers TP-250, TP-300, TP-2000, TP-3015 and TP-4015. As shown, machining center 2 in FIG. 2 is controlled by a computerized numerical controller (CNC) 28, connected to machining center 2 by cables through a conduit 30. Such CNC is well known and is for example, in the case of the above-mentioned Finn-Power TP punch press centers, manufactured by the Siemens Corporation having the manufacturing names Sinumerik 3N and 880N.

Figure 3:
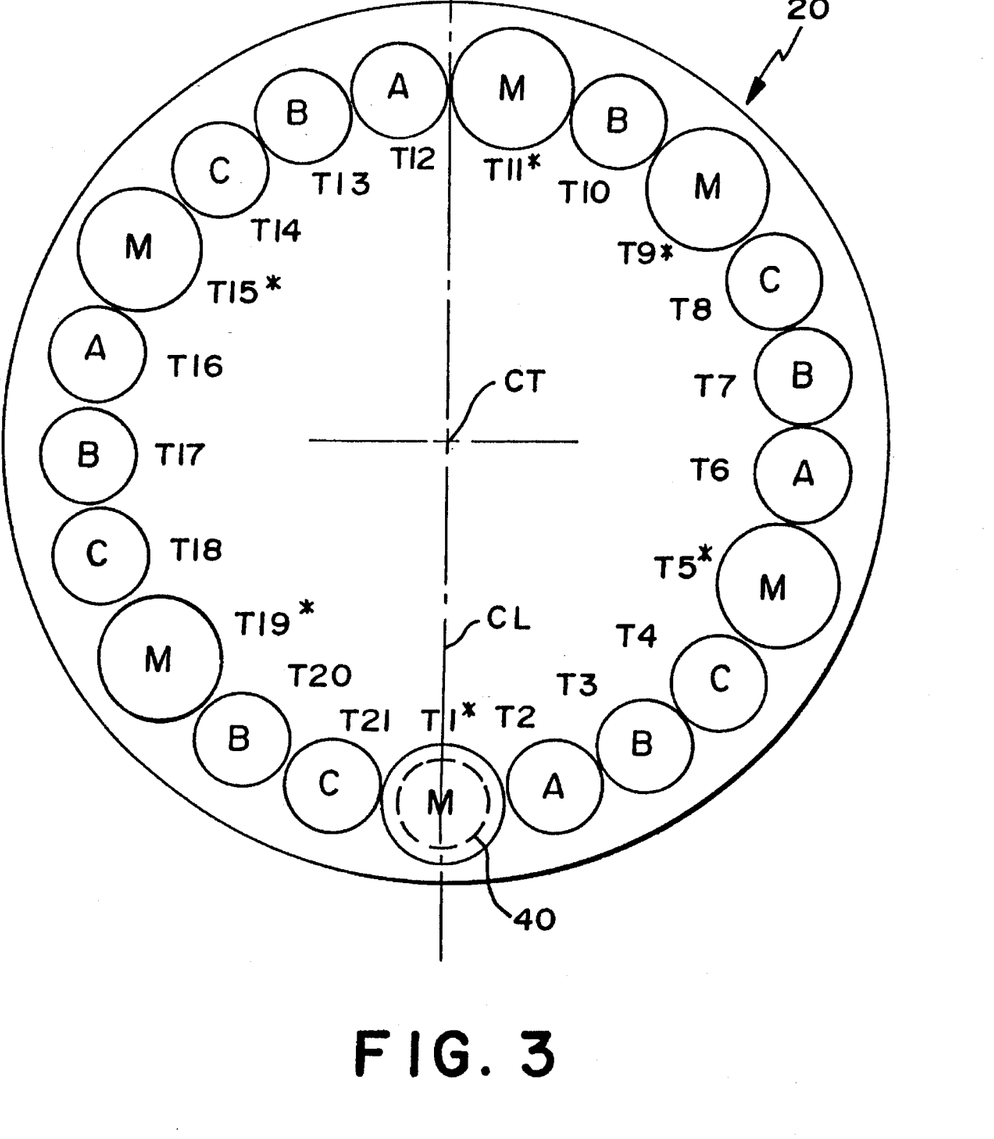
FIG. 3 is a plan view of a representative turret of the FIG. 1 machining station.

Turret 20 is more clearly shown in plan view in FIG. 3. There, it can be seen that turret 20 has at its peripheral portion, for example, twenty-one (21) receptacles for accepting 21 tools designated T1–T21. As shown, T1, T5, T9, T11, T15 and T19 are larger tools which may be MULTI-TOOLS. However, for the sake of simplicity and for the discussion of this invention, such larger tools T1–T19 each are considered to have only one tool and are represented, for example, by the combination tool holder and tool body shown in FIG. 4.

Continuing with the discussion of turret 20 of FIG. 3, as shown, tools T1, T5, T9, T11, T15 and T19 each are indicated by A; tools T3, T7, T10, T13, T17 and T20 B; and tools T4, T8, T14, T18 and T21 C. For the discussion of the present invention, tools having the same designation are deemed interchangeable tools; that is, if each of the tools were programmed to hit once, the same hole or opening is effected on worksheet 10 by tools T1, T5, T9, T11, T15 or T19; or by T2, T6, T12 or T16, etc. of course, a substantially identical opening or hole can be made by different types of tools if these tools were programmed to hit a worksheet several times, i.e. by nibbling. Thus, even though different tools can make differently configured holes, the different tools can be programmed to hit a worksheet several times to effect substantially identical openings. In any event, for the present discussion, interchangeability between tools means that each of the tools would make the same configured opening or hole on a worksheet if it only hits the worksheet once. Accordingly, different types of openings are effected by tools bearing the different designations A, B and C. Further, it should be noted that instead of 4 (or however many) different types of tools shown being fitted in turret 20, turret 20 could also have fitted thereto only one tool type for making the same configured opening. As noted above and should be recognized, albeit a turret is shown for containing the different types of tools, some mechanism other than a turret may also be used, so long as such mechanism can carry a plurality of tools some of which are interchangeable.

With reference to FIGS. 1–3, assume for the present invention that turret 20 is positioned at machining center 2 such that its center line CL is in alignment with top frame 6 and that tool T1 is positioned at location 26 under puncher 24.

Figure 4:
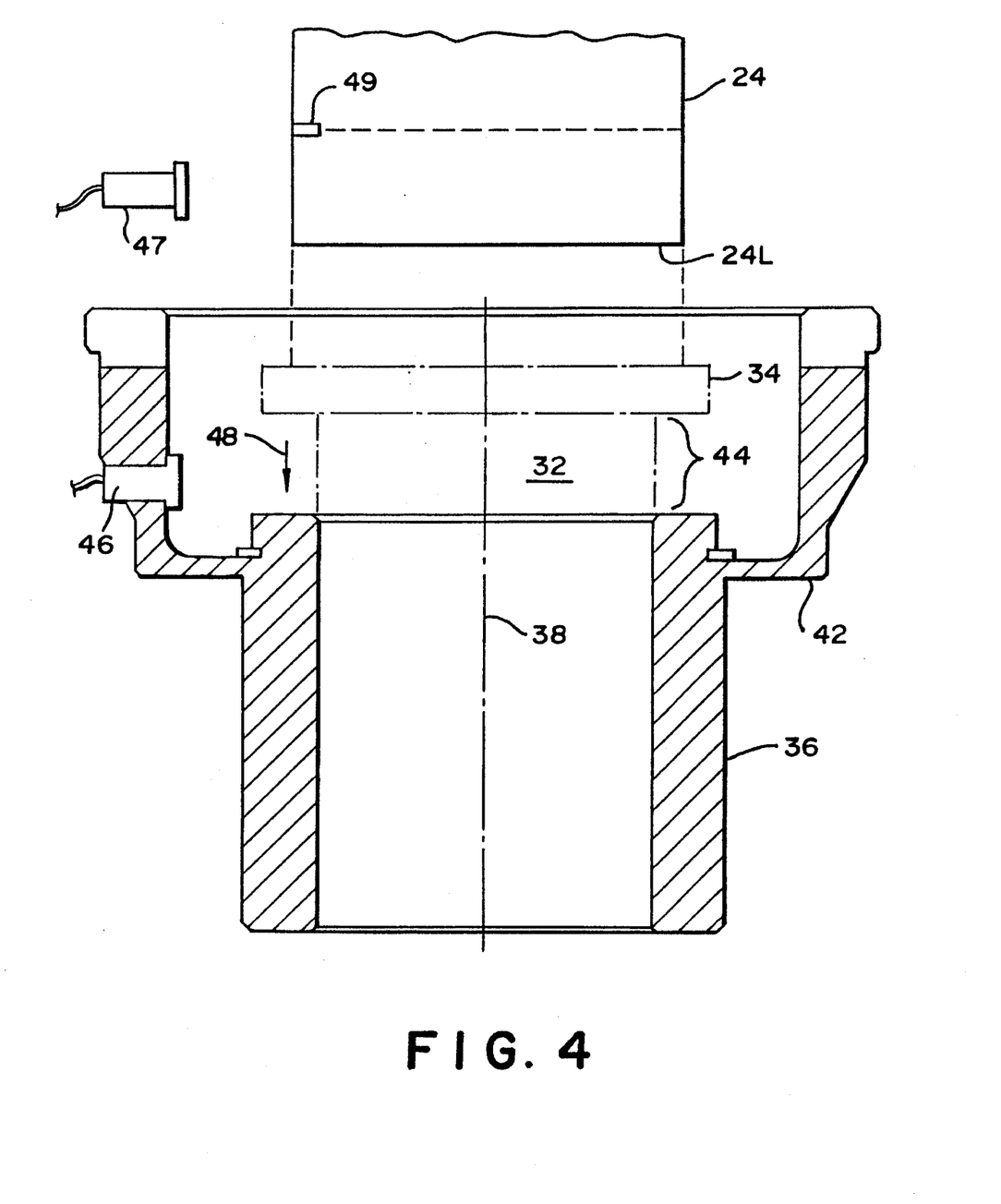
FIG. 4 is a sectional side view of an exemplar tool and its holder, which is insertable into one of the available receptacles in the turret machine tool station shown in FIG. 3.

The tool, and its housing, on which puncher 24 operates is discussed with reference to FIG. 4. As shown, tool T1, which is representative of the other tools T2–T21, comprises a tool body 32, as for example a punch, movably fitted along an axis 38 in a housing 36. Housing 36 is movably fitted into a corresponding receptacle represented, for example, by dotted circle 40 in FIG. 3. Tool holder housing 36, by its shoulder portion 42, fittingly rests on turret 20.

Tool body 32 has a top portion 34 to be struck by puncher 24. For the sake of clarity, a concentric spring surrounding housing 32 at portion 44 thereof is not shown. By using such spring, once tool 32 has been struck and driven to effect an opening on worksheet 10, after puncher 24 is removed from top portion 34, the spring will force top portion 34, and therefore tool 32 away from the punched worksheet and back into housing 36.

For the present invention, if detection of the movement of a tool is desired, such may be accomplished by detecting the movement of tool body 32 with a sensor 46, for example a Hall effect sensor, provided at shoulder portion of housing 36 to sense the movement of top portion 34 of tool body 32 in the direction indicated by arrow 48. In place of a Hall sensor, other conventional sensors including a microswitch may also be used to indicate the movement of tool body 32 along longitudinal axis 38. In essence, therefore, for the present invention system, if the movement of the tool body of a tool is used to determine the number of times that the tool has performed work (i.e. hit the worksheet), it should be appreciated that it is not so much the type of sensor used that is important; rather, it is the idea that each time tool body 32 (or tool such as T1) hits, it is measured. In other words, the number of times which tool body 32 has performed work can be, and is, measured or counted. The respective number of times the other tools T2–T21 operate could likewise be counted per the FIG. 4 illustration.

Yet a different method of measuring the number of hits by a tool on a worksheet can be accomplished without requiring any physical sensors. Such method may be accomplished by providing a program to the controller of the machining center to preset a number of hits to be effected by a tool for each production run. A hit module may be added as part of the controller of the machining center such that, upon receipt of the program, the hit module would output hit signals as soon as a worksheet, such as 10, is positioned correctly on worktable 8, as for example when a selected portion of worksheet 10 is positioned under tool T1 at location 26. The hit signals are provided by the hit module to tool puncher 24 by conventional means. At the same time, as each hit signal is output from the hit module, it is counted by a hit counter, which may also be a part of the numerical controller of the machining center. Therefore, the hit counter in essence performs the same function as sensor 46. A more detailed discussion of the hit module and hit counter is given hereinbelow.

An embodiment of the system of the present invention is discussed with reference to FIG. 5. As shown, turret 20 is positioned such that tool T1 is situated at location 26 (FIG. 2) to be under puncher 24. A signal providing the count of the number of times which tool T1 has performed work (sensed by sensor 46 of FIG. 4) on a worksheet is sent to a counter sensor 50 by lead 52. For this embodiment, count sensor 50 may actually be the same as sensor 46 of FIG. 2, or can be a shift register or some threshold turned-on device such as a Schmitt trigger electrically connected to sensor 46.

Turret 20 is shown to be rotatable by a spindle 54, which is connected to a turret motor 56. As illustrated by arrows 58, spindle 54 may be rotated either clockwise or counter-clockwise such that the next tool that may be moved into location 26 could be either tool T2 or tool T21 (see FIG. 3). For the cross-sectional view of turret 20 in FIG. 5, only tools T1–T5 are shown. As shown, when puncher 24 moves down to make contact with head 34, tool body 32 is driven in a downward direction for effecting a hole on a worksheet (not shown). Of course, the movement of tool body 32 (i.e. tool T1) can be sensed and counted by count sensor 50. For the present invention, the movement of each tool mounted on turret 20 is individually counted, per illustration of tool body 32 of tool T1.

Figure 5:
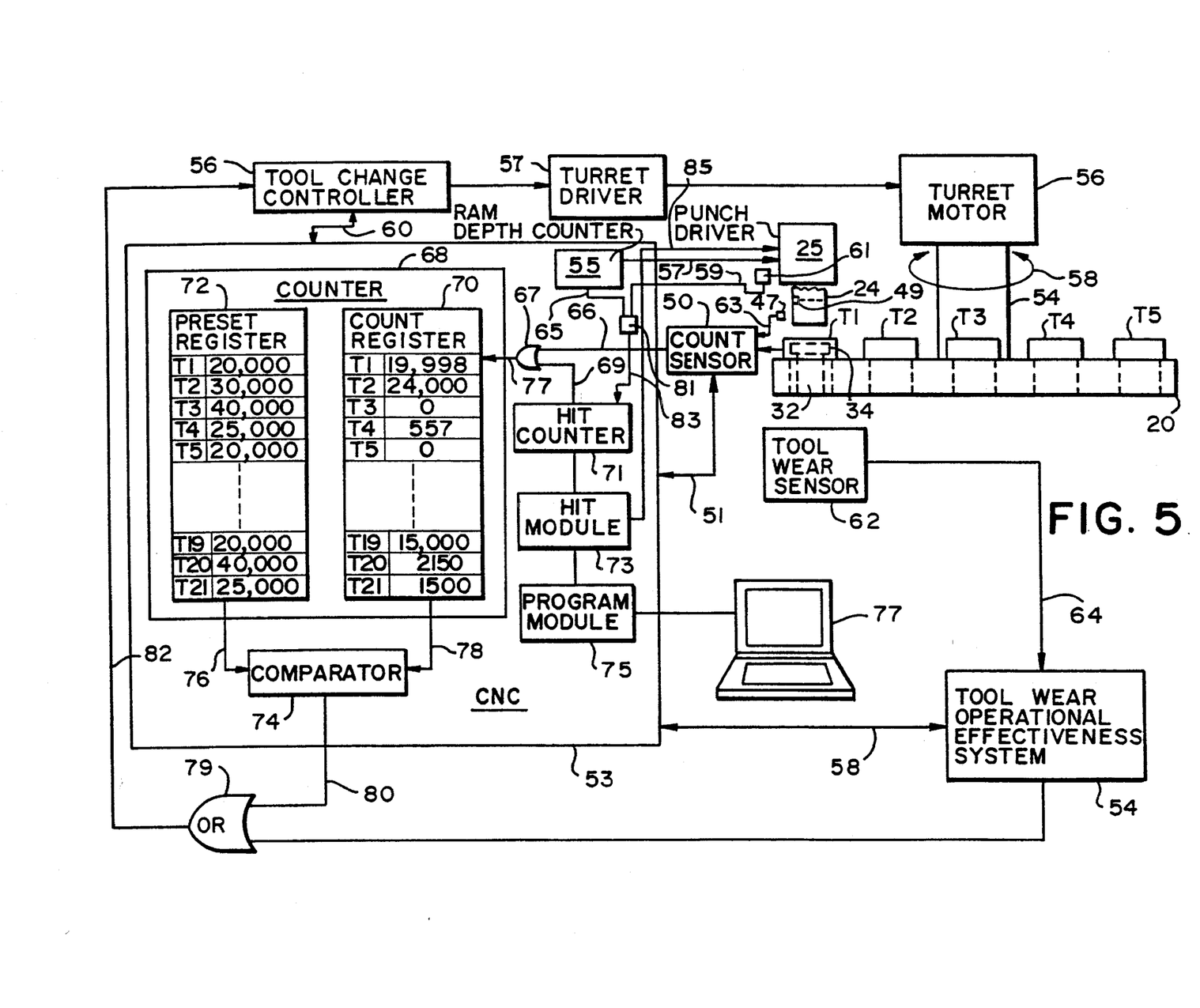
FIG. 5 is a simplified block schematic of an embodiment of the present invention.

For the FIG. 5 embodiment, count sensor 50 is controlled by a CNC processor 53, as for example the earlier noted Siemens controller. CNC 53 also provides control to a tool wear operational effectiveness system 54 and a conventional automatic tool change controller 56 via bi-directional controlling lines 58 and 60, respectively. FIG. 5 shows that there are two inputs being provided to CNC 53, one from count sensor 50 and the other from system 54.

Tool wear operational effectiveness system 54 is thoroughly discussed in co-pending application, filed on or about the same date as the present application, entitled Apparatus to Determine the Operational Effectiveness of A Machine Tool and a Method Therefor Ser. No. 07/773319 by the same inventor as the present invention and assigned to the same assignee as the same invention. The disclosure of the co-pending application is incorporated by reference herein.

Briefly, it is disclosed in the co-pending application that system 54, by utilizing a tool wear sensor such as 62 connected thereto by lead 64, can ascertain the operational effectiveness of a machine tool, such as for example T1, by qualifying the effectiveness with which the machine tool effects an opening on a worksheet. In other words, system 54 can determine whether a machine tool is broken, partially broken or operating effectively.

In regard to the input from count sensor 50 which deals with counting the number of times a tool has operated by a sensor, do note that the count provided by count sensor 50 is fed via line 66 to an OR gate 67 to a count register 70 in a counter 68. Counter 68, for this embodiment, can be considered as part of CNC 53, which also controls count sensor 50 via bi-directional line 51. Although shown to be a part of CNC 53, it should be noted that counter 68 could be a distinct component that resides outside of CNC 53. For example, counter 68 may in practice be comprised of conventional shift registers.

Also being shown to be connected to OR gate 67 as another input via line 69 is a hit counter 71, which in turn receives as an input an output from a hit module 73. A program module 75 provides the input to hit module 73. Provided as an input to program module 75 is an output from a terminal 77. As shown in the FIG. 5 embodiment, hit counter 71, hit module 73 and program module 75 each reside in CNC 53, and can be formed as components of CNC 53. Alternatively, hit counter 71 can be a conventional type of shift register while hit module 73 can be a conventional signal generator which sends out a signal periodically in response to an input. Program module 75 can be in the form of a programmed diskette or an expansion memory board, which contains instructions, or a program, input thereto by an operator utilizing terminal 77.

Program module 75, hit module 73 and hit counter 71 work interactively as follows. For each production run, for example a batch of worksheets to be worked on, the operator of the system would input a program for performing the production run from, for example, terminal 77, to CNC 53. Such program may include, for example, the number of hits to be effected by a tool on a worksheet. Subsequently, program module 75 can retrieve from this program the number of hits for each worksheet of the batch run that is to be performed by a given type of tool. In other words, program module 75 now contains the numerically controlled part program that tells puncher 24 the number of times that it should hit one of the tools in turret 20 to effect an opening on a worksheet. Accordingly, a signal is provided from program module 75 to hit module 73. Being a signal generator, given the instruction from program module 75, hit module 73 would provide a string of hit signals to hit counter 71 and to a punch driver 25 via line 85 to drive puncher 24, once the to be worked on worksheet has been positioned correctly on worktable 8.

Thus, for example, once grippers 18 have moved a selected portion of worksheet 10 under location 26 (see FIG. 2), hit module 73 is initiated to send out a hit signal to puncher 24 (via punch driver 25) to thereby cause puncher 24 to strike tool T1 to effect an opening on the selected portion of worksheet 10. At the same time, the hit signal sent out from hit module 73 is counted by hit counter 71 and routed by lead 69 to OR gate 67. And as different selected portions of worksheet 10 are moved to location 26, a string of hit signals are sent out from hit module 73 to punch driver 25 to drive puncher 24. The string of hit signals, meanwhile, is contemporaneously counted by hit counter 71 and provided via OR gate 67 to counter 68.

Thus, instead of sensing the actual physical movement of tool body 32 in order to count the number of times tool T1 has performed work (or operates), the number of times that tool T1 has performed work can also be counted by counting the number of hit signals provided by hit module 73 in response to the instructions fed thereto by program module 75. This alternative method of measuring the number of hits by a tool is particular useful in instances where a physical sensor cannot be placed proximately to a moving tool, or that the numerical controller that controls the operation of the machine tool does not have the capability of incorporating hit counter 71, hit module 73 and program module 75.

In place of detecting the physical movement of tool body 32, the detection of the depth movement of puncher 24, driven by punch driver 25, can also be used. Specifically, with reference to FIGS. 4 and 5, yet another conventional sensor such as 47, whose attachment to the frame of the machining center is not shown for the sake of clarity, can be positioned proximately to puncher 24. Thus, when puncher 24 is driven downward by punch driver 25, by means of an indicator such as 49, the depth of movement of puncher 24 is sensed by sensor 47. The location of indicator 49 and the positioning of sensor 47 of course are dependent on the relationship between puncher 24, more specifically the lower contact surface 24 L of puncher 24, and the tool, for example top portion 34 of tool body 32 in FIG. 4. Putting it differently, sensor 47 is positioned such that when puncher 24 makes a proper hit on tool at location 26 (FIG. 2), such movement is sensed by sensor 47 and fed as a signal, via line 63, to count sensor 50. Count sensor 50 would then count the signal from detector 47 as a hit and forward the same via line 66 to OR gate 67, and then to count register 70.

Instead of using a detector such as 47 to detect the actual depth movement of puncher 24, a different type of sensor such as a conventional analog linear variable differential transformer (LVDT) encoder 61 can also be used to detect, for example, the number of rotation of the shaft of the motor of punch driver 25. Do note that a digital encoder 61 for detecting pulses generated from punch driver 25 can also be used. Such digital encoder is made, for example, by the Heidenhein Company of Germany which has a U.S. sales office in Schaumburg, Ill.

In particular, in the situation where encoder 61, or other signal or detectors, is used, a ram depth counter 55 is also provided in CNC 53. Ram depth counter 55, as its name implies, can effect punch driver 25 to rotate its motor a certain number of times so as to drive puncher 24 to a given depth. The programming of how far to drive puncher 24 in ram depth counter 55 is done, for example, by an operator via terminal 77. Although not shown but as is conventional and well known, to determine the depth of movement of puncher 24, encoder 61 would measure, for example, the number of times the shaft of the motor (not shown) of punch driver 25 has rotated (analog) or the number of pulses generated therefrom (digital). The measured number of rotation is then converted into a corresponding signal.

Thus, inasmuch as ram depth counter 55 has been programmed to effect punch driver 55 to drive puncher 24 a given distance (or depth), the detection of whether or not such depth has been reached by encoder 61 would provide a feedback to CNC 52. Such feedback is achieved by using a comparator 81 to compare the instruction signals sent out by ram depth counter 55 and the depth data signals collected by encoder 61, in order to determine any deviation therebetween.

With reference to FIG. 5, it can be seen that ram depth counter 55 would effect the depth movement of puncher 24 via line 57. The depth movement of puncher 24 is detected by encoder 61, as the number of rotation of the motor shaft of punch driver 25 (or some other indication from punch driver 25), and fed via line 59 to comparator 81, which also has as another input an output 65 from ram depth counter 55. The signal from ram depth counter 55 at output 65 is representative of the depth to which puncher 54 is to be driven. The indicator data of punch driver 25 detected by encoder 61 is conventionally converted into a corresponding signal by a conventional converter (not shown). The thus converted signal, which corresponds to the actual depth movement of puncher 24, is then compared in comparator 81 with the theoretical depth movement of puncher 24 sent out by ram depth counter 55. If there is agreement between both signals, then a signal, in the form of a count, is provided from comparator 81 via line 83 to hit counter 71, to be counted as hit. With such a method, therefore, not only is there no need to locate a physical sensor close to a moveable puncher, there is also provided a feedback that could accurately adjust the depth of movement of puncher 24 to accommodate different tools to effect hits on worksheets.

In any event, the sensed count signals—by either physically detecting the movement of tool T1, determining the depth of movement of puncher 24, or counting the hit signals provided by hit module 73 to activate the tool, or a combination thereof—are provided through OR gate 67, via lead 77, to counter 68. It should be appreciated from above, moreover, that the detection of the movement or counting of the hit signals of the tool can also be mutually exclusive, inasmuch as either is independent of the other. Thus, a system of the present invention can operate equally well by solely using the counting the hit signals scheme, or the detection of the movement of the tool.

As shown, there is residing in counter 68, in addition to counter register 70, a preset register 72. Like counter 68, count register 70 and preset register 72 each may be made from a shift register residing outside of CNC 53 and having a maximum count. For the FIG. 5 embodiment, counter register 70 and preset register 72 each are divided into a number of sub-registers corresponding to tools T1–T21.

Preset register 72, as its name implies, is a register whereby a preset count number, or an upper limit, representing the number of times a tool can operate and which for example is established or defined by the manufacturer of the tool, is set. For example, as shown in FIG. 5, tool T1 has a count limit of 20,000; tool T2 a limit of 30,000; T3 a limit of 40,000, etc. Putting it simply, tool T1, for example, has been determined by its manufacturer, under ordinary operating conditions, that it can effectively operate 20,000 times. Putting it differently, once tool T1 has performed work 20,000 times, there is a high likelihood that it would become operationally ineffective, as for example by being prone to be broken or fractured.

The counter limit numbers for the different sub-registers of preset register 72 can be set by an operator, as for example by means of terminal 77. These sub-registers of preset register 72 can, of course, be reconfigured for different types of tools. Thus, if tool T1 were to be taken out from its receptacle in turret 20 and be replaced by another tool which has a life expectancy of 10,000 hits, then the count limit number for such another tool is reset to 10,000.

Counter register 70, in the meantime, contains the same number of sub-registers as preset register 72 each of which likewise corresponds to one of the tools mounted to turret 20. For count register 70, however, each of sub-registers T1–T21 in essence is a recorder for recording the number of hits sensed by count sensor 50 or counted by hit counter 71. For the illustrated FIG. 5 embodiment, for example, register T1 is shown to have recorded 19,998 hits; register T2 24,000 hits; T3 0 hits, etc. As should readily be evident, those sub-registers, for example T3 and T5, which show zero hits reflect brand new tools. From the recordings in counter register 70, therefore, it can be seen that tool T1, but for two additional hits, has reached the end of its established useful life (or life expectancy), whereas tool T4 has only operated 557 times and still has a life expectancy of well over 24,000 additional hits.

To compare the count numbers preset in register 72 with the number counted in register 70, a comparator 74 is used. Take for example the sub-registers of tool T1, which shows a life expectancy of 20,000 hits. Thus, with two additional hits sensed by count sensor 50 or hit counter 71, the life expectancy for tool T1 is reached. At that time, comparator 74 would send out a signal that indicates that the recorded count of the number of times tool T1 has performed work has at least reached the predetermined number of 20,000 hits.

The outputs from preset register 72 and count register 70 to comparator 74 are provided thereto via lines 76 and 78, respectively. The signal output from comparator 74 is fed via line 80 to an OR gate 79, which also receives as another input an output from tool wear operational effectiveness system 54. With a signal provided by either comparator 74 or system 54, or a combination of both, OR gate 79 will provide an enable signal via line 82 to tool change controller 56, which is a conventional type of controller that is known and used, for example, in the above discussed Finn-Power TP punch centers. Controller 56 then sends a signal to a conventional turret driver 58 which causes turret motor 56 to rotate, to thereby replace the now spent tool T1.

Referring back to FIG. 3, as was discussed before, with bi-directional turret motor 56, provided that turret 20 is to be rotated to bring into position the nearest interchangeable tool, tool T1 may be replaced by tool T19, if turret 20 were to rotate clockwise, or by tool T5, if turret 20 were to rotate counter-clockwise. The decision to use either tool T19 or T5 could be dependent on the number of times each of those tools has been used. For example, if a production run requires that a tool be used 10,000 times, then naturally it would only be appropriate to select tool T5 since tool T19 has already had 15,000 hits recorded. But if it were desirable to use up all the used tools before a new tool is to be used, then turret 20 is rotated in the clockwise direction to position tool T-19 at location 26. Insofar as tool T19 already has had 15,000 hits, after another 5,000 hits, a signal would again be sent out by comparator 74 to tool change controller 56 to initiate yet another tool change which, for this example, may now be a clockwise rotation of turret 20 to position tool T5 (or any of tools T9, T11 or T15) at location 26.

Of course, in place of replacing the spent or malfunctioned tool with a spare, CNC 53 can also stop the operation of the machining center and send out an alarm to alert an operator so that he may visually examine the in question tool. This is of paramount importance in unmanned systems where a malfunctioned tool could cause great damage, both economically as for example increasing production costs, and physically as for example causing harm to unsuspecting bystanders.

From this discussion, therefore, it should be apparent that the system of the present invention is configured such that each of the replacement tools, i.e. a spare tool such as tool T19 that replaces tool T1, in turn has a waiting replacement tools, i.e. spare tool T5 in the above example. Thus, with a large enough turret, or other replacement magazines, the replacement of a working tool with a spare tool can proceed ad infinitum. This depends, of course, on the interchangeability of the tools, as for example that tool T1 is interchangeable with tool T5, tool T2 is interchangeable with tool T6, etc.

Although the FIG. 5 embodiment illustrates two alternatives in which tool change controller 56 may be signaled to initiate the replacement of a tool, it should be appreciated that each of those alternatives may stand on its own. In other words, the FIG. 5 embodiment would work equally well if only the number of times which a tool operates—by either sensing physical tool movements or hit signals—is used as the determinant in ascertaining whether that tool needs to be replaced. Alternatively, by utilizing the tool wear sensor 62 and the tool wear operational effectiveness system 54 whose operation is discussed in the above incorporated by reference co-pending application, the replacement of the tool can also be determined solely by the operational effectiveness of the tool per se. For the present invention system, the inventor has found that each of the above alternatives works equally well. And by combining both of those alternatives into the embodiment shown in FIG. 5, redundancy and accordingly a measure of safety are provided, inasmuch as each alternative, and the system therefor, provides a back-up for the other.

Figure 6:
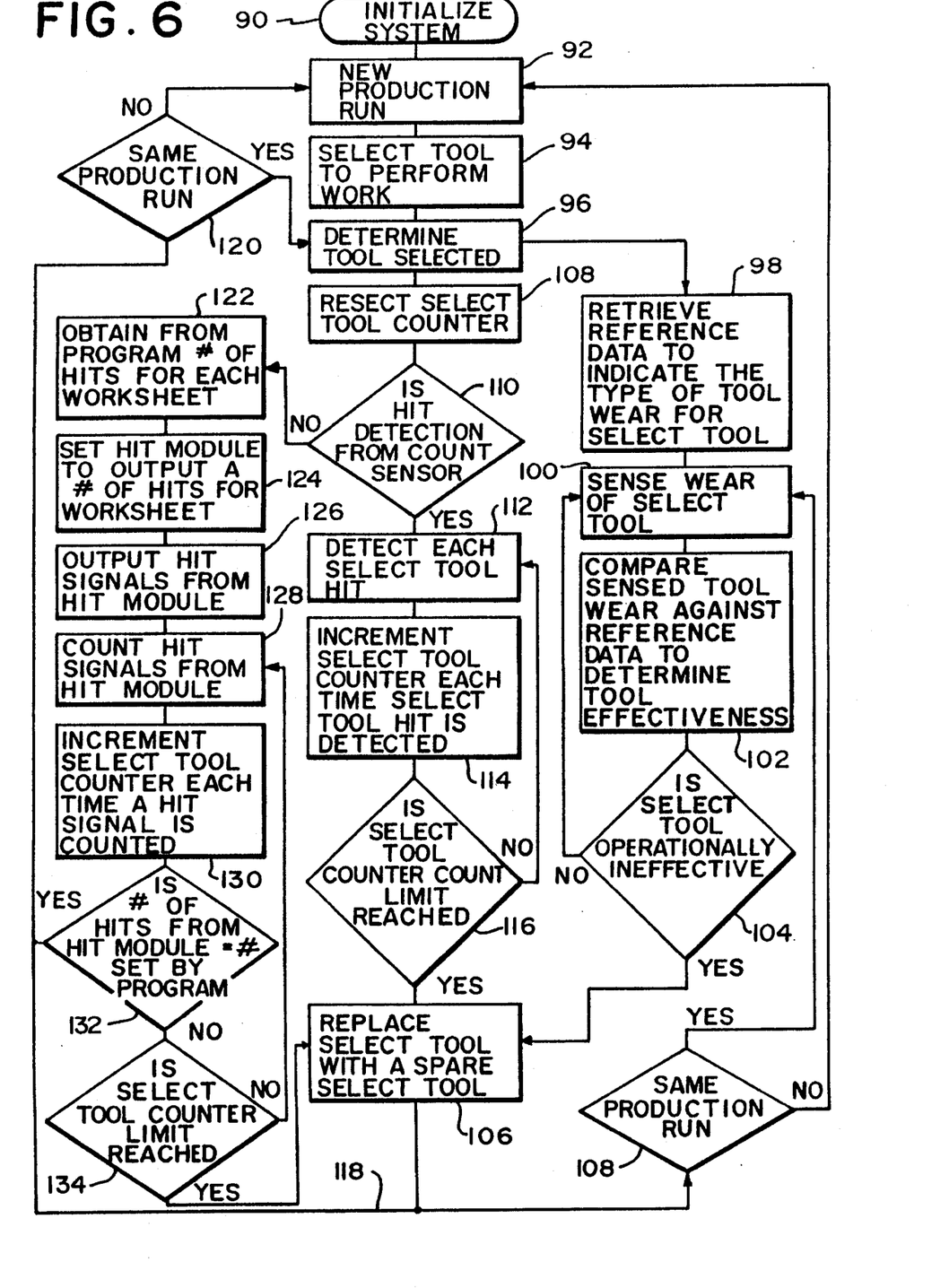
FIG. 6 is a flow chart illustrating the different operational steps of the present invention system.

FIG. 6 is a flow chart illustrating the operational steps of the present invention system.

The operation of the present invention system begins at block 90 where the operation of the system is initialized. A new production run is indicated at block 92. Thereafter, a first tool is selected to perform work on a worksheet as for example tool T1 to perform work on worksheet 10, as indicated at block 94. In block 96 a determination is made on what tool has been selected. From there each alternative system would take over independently to determine whether the tool is operating effectively or that it has reached the end of its life expectancy and is therefore prone to failure.

Starting with the actual detection of the tool wear as indicated by the rightmost branch of the flow chart, block 98 indicates that reference data is retrieved to indicate the type of tool wear for the selected tool. The wear of the tool is sensed in block 100 by tool wear sensor 62. This sensed tool wear is compared against the reference data to determine whether the tool is still operating effectively in block 102. At block 104 whether or not the tool is operating effectively is determined. If it is operating effectively, the system would return to block 100 to continue its sensing of the tool wear of the selected tool. However, if the tool has been determined to operate ineffectively, then the system operation is routed to block 106 for triggering tool change controller 56 to initiate the replacement of the selected tool with a spare tool.

Once the tool has been replaced, the system operation proceeds to block 108 to determine if it is still the same production run. If it is, operation is returned to block 100 to again begin sensing the tool wear of the spare tool, now considered the selected tool. Of course, a second spare tool is now in position to replace the selected spare tool. If it is not the same production run, then the system operation returns to block 92 to begin a new production run.

With regard to the system operation illustrated in the leftmost and center branches of FIG. 6, once the type of tool selected is determined in block 96, the specific sub-register in count register 70, for example the sub-register for tool T1, is reset in block 108. It should be noted, however, that since turret 20 can have a number of tools each of which may be used on separate occasions, each of those tools may already have had performed work. For example, since tool T1 already has had 19,998 hits, corresponding recording sub-register T1 of count register 70 would not be reset to 0, but rather to its last recorded count number, i.e. 19,998.

A decision is made in block 110 to determine if the select tool hits are to be detected from count sensor 50. If it is, the system operation proceeds to block 112 where each select tool hit is determined by count sensor 50 (or sensor 46 in FIG. 4). With each detected count, the corresponding recording sub-register in count register 70 is incremented in block 114. From there a determination is made on whether the count limit, as reflected in the corresponding register in preset register 72, has been reached in block 116. If not, the system operation returns to block 112 to continue its monitoring of the number of hits by the tool. If the count limit indeed has been reached, then the system operation is routed to block 106 to replace the spent tool with a spare. After such replacement, the system operation is routed through line 118 to block 120 to determine whether the system is still operating in the same production run. If it is, the system operation is routed to block 96 to determine once again the tool that has been selected, this in spite of the fact that the spare tool selected to replace the now spent tool is interchangeable therewith. If, however, a determination is made in block 120 that after the spent tool has been replaced, a new production is to take place, then the system operation is routed to block 92 to begin a new production run.

Returning to block 110, if it were determined that the hit to be detected is not from count sensor 50, the system operation is routed to block 122 to obtain from program module 75 the number of hits that is to be effected for each worksheet for this production run. Once the number of hits has been obtained, a signal is sent from program module 75 to hit module 73 to output a number of hit signals for each worksheet of the production run. The hit signals from hit module 73 are singly output to both punch driver 25 (FIG. 5) and hit counter 71 at block 126. At block 128, the number of hit signals output from hit module 73 is counted by hit counter 71. Each of the counted hit signals is then incremented in the corresponding recording sub-register of count register 70 in block 130. Next, a determination is made on whether the number of hit signals output from hit module 73 is the same as the number set by program module 75 at block 132. If it is, then the system operation is routed to block 120 to determine whether it still is the same production run. If it is, a determination is then made on the tool to be selected for further processing the worksheets at block 96. If it is not the same production run, the system operation is routed to block 92 to begin a new production run.

If, however, the number of hit signals from hit module 73 is less than or not equal to the number set by program module 75, a determination is made in block 134 on whether the select tool counter limit has been reached, by a comparison between the respective corresponding sub-registers in preset register 72 and counter register 70. If the select tool counter limit has not been reached, then the system operation is routed to block 128 to continue to count the hit signals from hit module 73. If the selected tool counter limit has been reached, then the system operation is routed to block 106 to initiate tool change controller 56 to replace the selected tool with an interchangeable spare tool. Thereafter, the system operation is routed to block 120 to determine whether it still is the same production run. If it is, then a determination is made on the type of tool selected in block 96. If it is not, then a new production run takes place at block 92.

Figure 7:
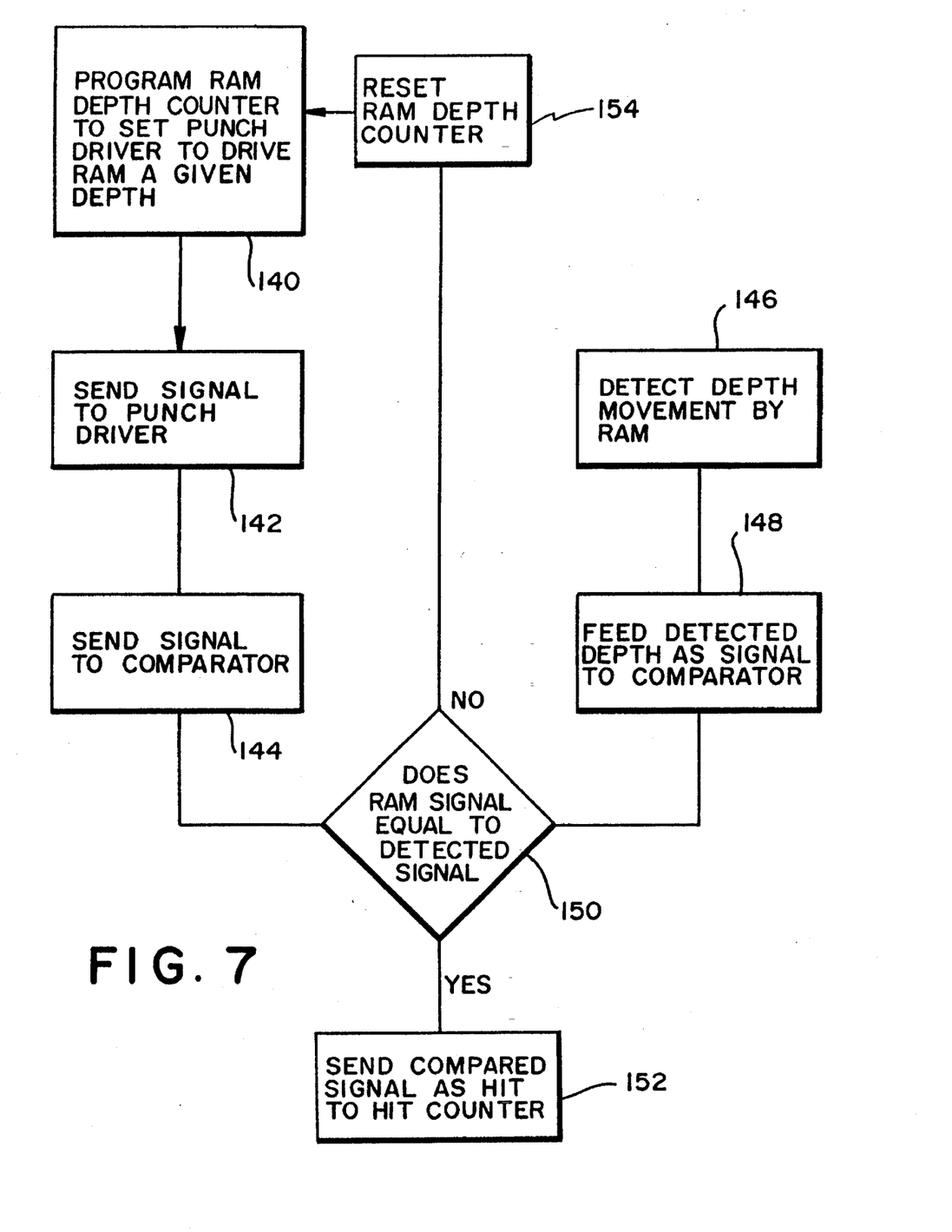
FIG. 7 is a flow chart illustrating an embodiment detecting a hit for the present invention system.

FIG. 7 is a flow chart illustrating the embodiment of the present invention whereby a hit is equated with the depth movement of puncher 24.

For this embodiment of detecting a hit, starting at block 140, ram depth counter 55 (FIG. 5) is programmed by an operator in CNC 53 to effect puncher driver 25 to drive puncher 24 a given depth. As should be appreciated, each type of tool may require a different depth movement by punch 24. Therefore, for each type of tool, program ram depth counter 55 is programmed accordingly. For example, a count of 5 may mean that puncher 24 is to be moved 5 cm, while a count of 10 could mean that puncher 24 is to be driven 10 cm. In any event, the signal corresponding to how far puncher 24 is to be driven is sent by ram depth counter 55 to punch driver 25 at block 142. This signal is also sent to comparator 81 in block 144.

As puncher driver 25 is activated to drive puncher 24, the depth at which puncher 24 is driven could be measured by the length of time the motor of punch driver 25 is activated, i.e. the number of rotation of the motor shaft. This is done by a detector such as for example encoder 61, in block 146. The thus measured signal by encoder 61 is then fed as a signal to comparator 81 at block 148. As was mentioned previously, the conversion of the depth movement detected by encoder 61 into a corresponding signal is conventional and need not be further discussed.

In decision block 150, the signal sent by ram depth counter 55 to control the movement of punch driver 25 to drive punch 24 is compared with the signal detected by encoder 61. If there is a correspondence, then the result is provided as a hit signal to counter 71 at block 152. The same operational steps discussed above in regard to how hit counter 71 would feed a signal received from hit module 73 to count register 71 is equally applicable herein. Accordingly, no further discussion with regard to the signal from comparator 81 is required. If, however, comparator 81 decides that the signal from ram depth counter 55 is not the same as that detected by encoder 61, then naturally no hit signal is provided to hit counter 71. At the same time, a determination is made on whether ram depth counter 55 is operating correctly. If not, it is reset as indicated by block 154.

Inasmuch as the present invention is subject to many variations, modifications and changes in detail, it is intended that all matter described though this specification and shown in the accompanying drawings be interpreted as illustrative only and not in a limiting sense. Accordingly, it is intended that the invention be limited only by the spirit and scope of the appended claims.

I claim:

1. A work station having a worktable onto which worksheets to be worked on are placed, a first tool means positioned in proximate relation to said work station for performing work on successive ones of said worksheets at a work location, apparatus for ensuring each one of said worksheets is not worked on by an operationally ineffective tool means, comprising:

at least one additional tool means positioned relative to said work station and movable to said work location for replacing said first tool means;

means for generating hit signals to operate said first tool means;

means for counting each hit signal output from said hit signal generating means;

means associated with said work station for automatically replacing said first tool means with said additional tool means at said work location when the number of hit signals output from said hit signal generating means to operate said first tool means, as counted by said counting means, reaches a predetermined number.

2. The work station of claim 1, wherein said counting means comprises:

a first register means set to a predetermined count;

a second register means adaptable to count said each hit signal; and wherein said work station further comprising:

means for comparing the count in said second register means against said predetermined count in said first register means, said replacing means replacing said first tool means with said additional tool means when the count in said second register means at least equals to said predetermined count in said first register means.

3. The work station of claim 1, further comprising:

at least another additional tool means positioned relative to said work table, said first tool means, additional tool means and another additional tool means all being interchangeable so that said worksheet can be effectively worked on by any one of said tool means.

4. The work station of claim 1, further comprising:

a plurality of tool means at least one of which being interchangeable with said first tool means;

wherein said counting means comprises:

first register means having different predetermined count limits each set for a corresponding one of said plurality of tool means, said first register means further having a first predetermined count limit for said first tool means;

second register means having a plurality of counter means each for counting the number of times a hit signal is generated for a corresponding one of said plurality of tool means, said second register means having a first counter means for counting the number of times hit signals are generated to operate said first tool means;

wherein when said first counter means has a count that at least equals to said first predetermined count limit, said replacing means proceeds to replace said first tool means with an interchangeable tool means from said plurality of tool means whose corresponding second register means does not register a count that equals to its corresponding count limit set in said first register means.

5. The station of claim 1, further comprising:

means for instructing said generating means to output a specific number of hit signals, each of said hit signals effecting said first tool means to operate once.

6. The station of claim 1, further comprising:

means for monitoring the movement of said first tool means when it operates, said movement being provided as a signal to said counting means.

7. The station of claim 1, further comprising:

means for driving said first tool means to perform work on said worksheet, said driving means being activated to drive said first tool means once each time it receives a hit signal from said generating means.

8. The work station of claim 1, further comprising:

means for sending a signal to effect said first tool means to be driven a given distance;

means for measuring the distance of movement of said first tool means; and means for comparing said signal and said measured movement distance, the compared result being provided to said counting means as a tool operation if there is a correspondence between said signal and said measured movement distance.

9. The work station of claim 8, wherein said sending means comprises:

means programmable to effect different tools to be driven different distances.

10. A work station having a worktable onto which a worksheet to be worked on is placed, gripper means for positioning said worksheet on said worktable, a turret positioned relative to said worktable, a first tool means rotatably mounted on said turret and positioned at a work position of said work station for performing work on said worksheet, apparatus for ensuring said worksheet is effectively worked, comprising:

at least a second tool means rotatably mounted on said turret and positionable to said work position of said work station to perform work on said worksheet;

means for ascertaining, on a non-time dependent tool wear basis, whether said first tool means is effective for performing work on said worksheet;

means for replacing said first tool means with said second tool means by rotating said turret to position said first tool means away from said work position and said second tool means to said work position when said ascertaining means determines said first tool means to be no longer effective for performing work on said worksheet.

11. The work station of claim 10, further comprising:

a plurality of tool means including said first and second tool means rotatably mounted on said turret, at least one of said plurality of tool means being interchangeable with said first and second tool means for performing work on said worksheet;

wherein said ascertaining means utilizes a determination of whether the quality of an operation effected on said worksheet is above a preset quality due to tool wear for determining the operational effectiveness of the tool means that effected said operation on said worksheet; and wherein said replacing means replaces said tool means that effected said operation on said worksheet with an interchangeable tool means from said plurality of tool means if the quality of said operation is determined to be below said preset quality.

12. The work station of claim 11, wherein said plurality of tool means comprises punches of different sizes, only punches of substantially the same size being interchangeable.

13. A numerically controlled machining center having at least one work station, a worktable onto which successive ones of worksheets for movement with respect to said work station are placed, moving means associated with said worktable for presenting each successive one of said worksheets to said work station, a plurality of tool means positioned relative to said work station each adaptable for performing work on each of said worksheets, one of said plurality of tool means selected to perform work on said each worksheet at a work location, comprising:

means for generating signals for operating said one tool means;

means for keeping a count of the number of said signals generated by said generating means to operate said one tool means;

means for replacing said one tool means with another tool means from said plurality of tool means for performing work at said work location when the kept count for said one tool means reaches a predetermined number.

14. The center of claim 13, wherein said keeping means comprises:

a first register means having multiple predetermined count numbers each assigned to a corresponding one of said plurality of tool means;

a second register means for respectively counting the number of times corresponding hit signals are generated for each of said plurality of tool means;

wherein when the count number in said second register means for any tool means selected to perform work on said worksheet at least equals to the assigned predetermined count number in said first register means for said any tool means, said replacing means replaces said any tool means with a tool means from said plurality of tool means that is interchangeable with said any tool means and whose count number in said second register means is less than its corresponding assigned predetermined count number in said first register means.

15. The center of claim 13, wherein said plurality of tool means comprises punches.

16. The center of claim 13, further comprising:

means for instructing said generating means to output a specific number of hit signals, each of said hit signals effecting said one tool means to perform work once.

17. The center of claim 13, further comprising:

means for monitoring the movement of said one tool means each time it performs work, said movement being provided as a signal to be recorded by said recording means.

18. The station of claim 13, further comprising:

means for driving said one tool means to perform work on said each worksheet, said driving means being activated to singly drive said one tool means to perform work on said each worksheet each time it receives a hit signal from said generating means.

19. The center of claim 13, further comprising:

means for sending a signal to effect said one tool means to be driven a given distance;

means for measuring the distance of movement of said one tool means; and means for comparing said signal and said measured movement distance, the compared result being provided to said keeping means as a tool operation if there is a correspondence between said signal and said measured movement distance.

20. The center of claim 19, wherein said sending means comprises:

means programmable to effect different tools to be driven different distances.

21. A numerically controlled machining center having at least one work station, a worktable onto which a worksheet for movement with respect to said work station is placed, moving means associated with said worktable for presenting said worksheet to said work station, a turret, a plurality of tool means each rotatably mounted on said turret and positionable to a work position relative to said work station, each of said tool means adaptable for performing work on said worksheet, one of said plurality of tool means selected to perform work on said worksheet, comprising:

means positioned proximately to said worktable for monitoring the operational effectiveness of said selected tool means performing work on said worksheet, said operational effectiveness being based on the amount of wear of said selected tool means;

means for replacing said selected tool means with another tool means by rotating said turret to position said selected tool means away from said work position and said another tool means to said work position when said monitoring means determines said selected tool means to be ineffective for performing work on said worksheet.

22. The work station of claim 21, further comprising:

a plurality of tool means including said selected and another tool means, at least one of said plurality of tool means being interchangeable with said selected and another tool means for performing work on said worksheet;

wherein said monitoring means utilizes the quality of the operation effected on said worksheet for determining the operational effectiveness of said selected tool means; and wherein said replacing means replaces said selected tool means with said another tool means from said plurality of tool means if the quality of said operation is determined to be below a preset quality.

23. A numerically controlled machining center having at least one work station, a worktable onto which a worksheet for movement with respect to said work station is placed, moving means associated with said worktable for presenting said worksheet to said work station, a plurality of tool means positioned relative to said work station each adaptable for performing work on said worksheet, one of said plurality of tool means selected to perform work on said worksheet, comprising:

means for recording at least a count of the number of times said one tool means performs work;

means positioned proximately to said work table for monitoring the operational effectiveness of said one tool means;

means for replacing said one tool means with another tool means from said plurality of tool means when either the recorded count for said one tool means reaches a predetermined number or said monitoring means determines said one tool means to be operationally ineffective.

24. The center of claim 23, wherein said recording means comprises:

a first register means having multiple predetermined count numbers each assigned to a corresponding one of said plurality of tool means;

a second register means for respectively counting the number of times each of said plurality of tool means performs work;

wherein said replacing means replaces said one tool means with said another tool means when the count number for said one tool means in said second register means at least equals to the corresponding predetermined count number assigned thereto in first register means.

25. The center of claim 23, wherein said recording means comprises:

a first register means having different predetermined count numbers each assigned to a corresponding one of said plurality of tool means;

a second register means for respectively counting the number of times each of said plurality of tool means performs work;

wherein when the count number for any tool means in said second register means at least equals to the assigned predetermined count number in said first register means for said any tool means, said replacing means replaces said any tool means with a tool means from said plurality of tool means that is interchangeable with said any tool means and whose count number in said second register means is less than its corresponding assigned predetermined count number in said first register means.

26. The center of claim 23, wherein said monitoring means comprises:

means for determining the quality of the work performed on said worksheet by said one tool means;

means for comparing the determined quality with a preset quality to ascertain the operational effectiveness of said one tool means;

wherein said replacing means replaces said one tool means with said another tool means if the determined quality is below said preset quality.

27. The center of claim 23, further comprising:
means for generating hit signals each corresponding to each time said one tool means performs work;
counter means for sensing each of said generated hit signals, each of said sensed hit signals being provided as individual counts to said recording means.

28. The center of claim 27, further comprising:
means for instructing said generating means to output a specific number of hit signals, each of said hit signals effecting said one tool means to perform work once.

29. The center of claim 27, further comprising:
means for driving said one tool means to perform work on said worksheet, said driving means being activated to drive said one tool means once each time it receives a hit signal from said generating means.

30. The center of claim 23, further comprising:
means for monitoring the movement of said one tool means each time it performs work, said movement being provided as a signal to be recorded by said recording means.

31. The center of claim 23, further comprising:
means for sending a signal to effect said one tool means to be driven a given distance;
means for measuring the distance of movement of said one tool means; and
means for comparing said signal and said measured movement distance, the compared result being provided to said recording means as a tool operation if there is a correspondence between said signal and said measured movement distance.

32. The center of claim 31, wherein said sending means comprises:
means programmable to effect different tools to be driven different distances.

33. In a numerically controlled machining center having at least one work station, a worktable onto which successive ones of worksheets for movement with respect to said work station are placed, moving means associated with said worktable for presenting each successive ones of said worksheets to said work station, a first tool means positioned relative to said work station for performing work on said each successive worksheet at a work location, a method of ensuring said worksheet is not worked on by an operationally ineffective tool means, comprising the steps of:
positioning at least one spare tool means relative to said work station;
counting the number of times signals are output by a signal generating means to operate said first tool means;
replacing said first tool means with said spare tool means at said work location when the counted number of times signals are output to operate said first tool means reaches a predetermined number.

34. The method of claim 33, wherein said counting step comprises the steps of:
setting a predetermined count number for said first tool means;
comparing the counted number of times signals are output by said signal generating means to said first tool means with said predetermined count number; and
said method further comprising the step of:
initializing a means for performing said replacing step when said counted number at least equals said predetermined count number.

35. The method of claim 33, further comprising the step of:
providing instructions to said signal generating means to output a specific number of hit signals, each of said hit signals effecting said first tool means to operate once.

36. The method of claim 33, further comprising the steps of:
monitoring the movement of said first tool means when it operates; and
providing said movement as a signal to be counted in said counting step.

37. The method of claim 33, further comprising the step of:
utilizing each of said generated signals to singly operate said first tool means to perform work on said each worksheet.

38. The method of claim 33, further comprising the steps of:
sending a signal to effect said first tool means to be driven a given distance;
measuring the distance of movement of said one tool means; and
comparing said signal and said measured movement distance, the compared result being instrumental in causing said first tool means to be replaced by said spare tool means if there is a correspondence between said signal and said measured movement distance.

39. In a numerically controlled machining center having at least one work station, a worktable onto which a worksheet for movement with respect to said work station is placed, moving means associated with said worktable for presenting said worksheet to said work station, a turret rotatably positioned relative to said worktable, a first tool means rotatably mounted to said turret and positioned relative to a work position of said work station for performing work on said worksheet, a method of ensuring said worksheet is not worked on by an operationally ineffective tool means, comprising the steps of:
rotatably mounting at least one spare tool means to said turret;
monitoring the operational effectiveness of said first tool means to perform work on said worksheet;
correlating said operational effectiveness with the amount of wear of said first tool means;
replacing said first tool means with said spare tool mean by rotating said turret to position said first tool means away from said work position and said spare tool means to said work position when said first tool means is determined to be ineffective for performing work on said worksheet.

40. The method of claim 39, wherein said monitoring step comprises the step of:
sensing the quality of the operation effected on said worksheet by said first tool means to determine the operational effectiveness of said first tool means; and
wherein said replacing step comprises the step of:
comparing the sensed quality of operation with a preset quality to ascertain the operational effectiveness of said first tool means, said first tool means ascertained to be operationally ineffective if said sensed quality is below said preset quality.

41. In a numerically controlled machining center having at least one work station, a worktable onto which a worksheet for movement with respect to said work station is placed, moving means associated with said worktable for presenting said worksheet to said work station, a plurality of tool means positioned relative to said work station each adaptable for performing work on said worksheet, a method of ensuring said worksheet is effectively worked on, comprising the steps of:

(a) selecting one tool means from said plurality of tool means to perform work on said worksheet;

(b) recording at least a count of the number of times said selected tool means performs work;

(c) monitoring the operational effectiveness of said selected tool means;

(d) selecting another tool means from said plurality of tool means interchangeable with said selected tool means to replace said selected tool means if the recorded count for said selected tool means reaches a predetermined number or said selected tool means is determined to be operationally ineffective;

(e) repeating steps (b) to (d) for each selected tool means.

42. The method of claim 41, wherein said step (b) further comprises the steps of:

assigning respective predetermined count numbers to corresponding ones of said plurality of tool means;

counting the respective number of times each of said plurality of tool means performs work; and wherein said step (d) comprises the step of:

replacing said selected tool means with said another selected tool means when the counted number for said selected tool means having perform work at least equals to the corresponding predetermined count number assigned thereto.

43. The method of claim 42, wherein said step (c) further comprises the steps of:

determining the quality of the work performed on said worksheet by said selected tool means;

comparing the determined quality with a preset quality to ascertain the operational effectiveness of said selected tool means; and wherein said step (d) further comprises the step of:

replacing said selected tool means with said another selected tool means if the determined quality is below said preset quality.

44. The method of claim 41, further comprising the steps of:

(f) generating hit signals each corresponding to each time said selected tool means performs work;

(f) sensing each of said generated hit signals, each of said sensed hit signals being provided as individual counts to be recorded in said recording step.

45. The method of claim 44, further comprising the step of:

(g) instructing said generating means to output a specific number of hit signals, each of said hit signals effecting said selected tool means to perform work once.

46. The method of claim 44, further comprising the step of:

(j) utilizing each of said generated hit signals to singly drive said selected tool means to perform work on said worksheet.

47. The method of claim 41, further comprising the steps of:

(h) monitoring the movement of said selected tool means each time it performs work; and (i) providing the movement as a signal to be recorded in said recording step.

48. The method of claim 41, further comprising the steps of:

(k) sending a signal to effect said selected tool means to be driven a given distance;

(l) measuring the distance of movement of said selected tool means; and (m) comparing said signal and said measured movement distance, the compared result being provided to said recording step to be counted if there is a correspondence between said signal and said measured movement distance.

* * * * *